June 12, 1962  L. J. SIRI  3,038,974
CRANKCASE OIL LEVEL CONTROL
Filed June 15, 1959  2 Sheets-Sheet 1
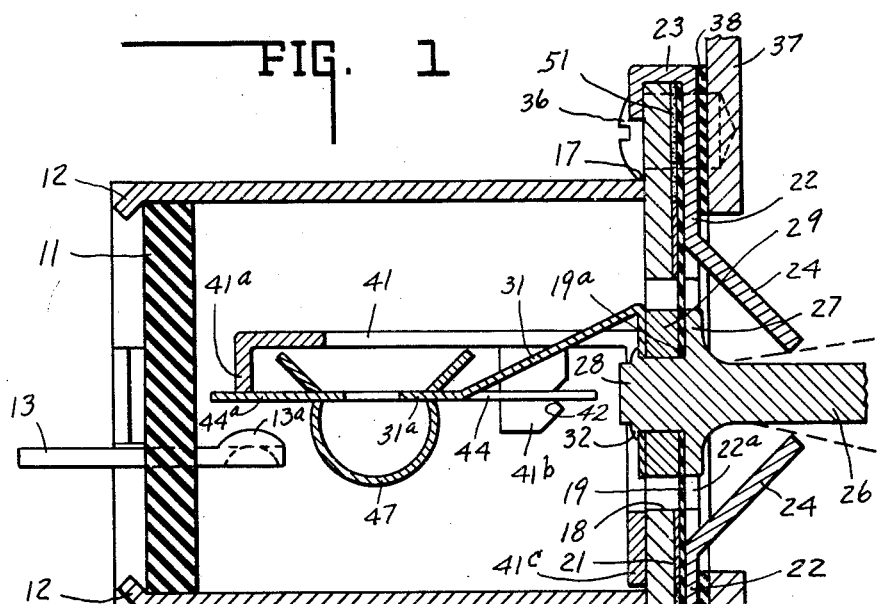
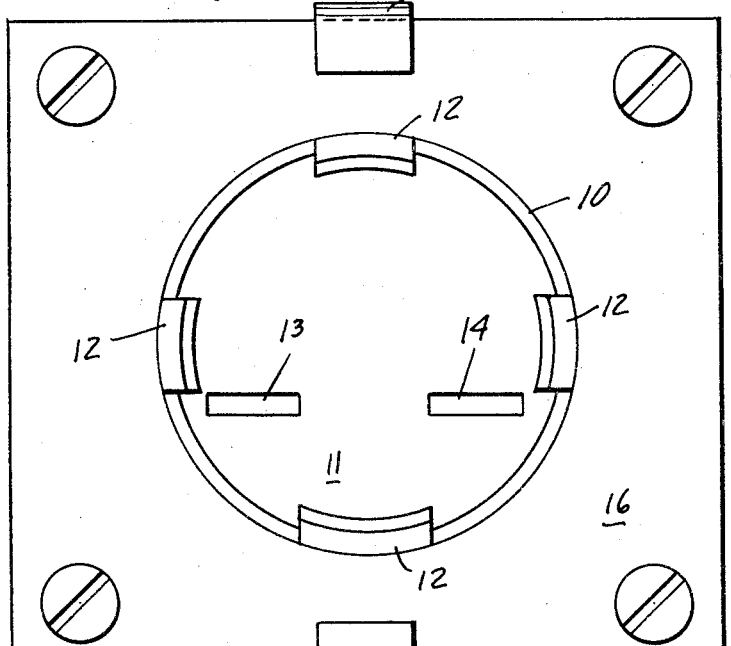
INVENTOR.
LOUIS J. SIRI.
BY
Lockwood, Woodard, Smith & Weikart.
ATTORNEYS.

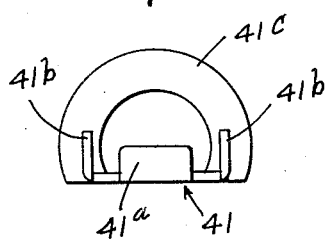
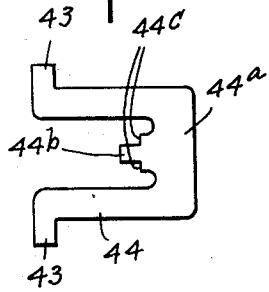
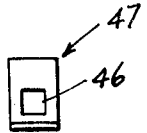
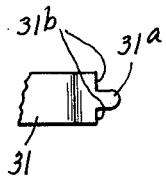
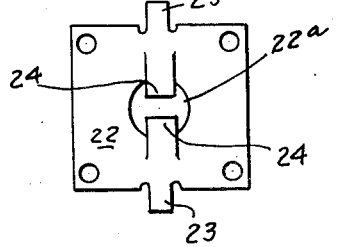
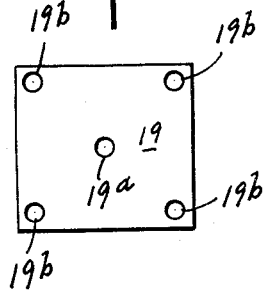
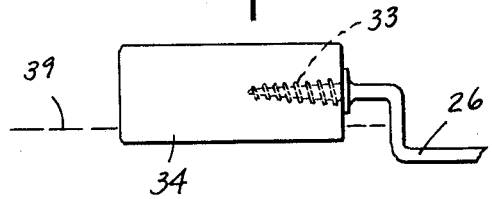

United States Patent Office 3,038,974
Patented June 12, 1962

3,038,974
CRANKCASE OIL LEVEL CONTROL
Louis J. Siri, South Bend, Ind., assignor to Penn Controls, Inc., Goshen, Ind., a corporation
Filed June 15, 1959, Ser. No. 820,540
3 Claims. (Cl. 200—84)

This invention relates generally to liquid level responsive controls and in particular to a switching device responsive to the oil level in the crankcase of an engine such as an internal combustion engine.

Internal combustion engines used for driving equipment, such as compressors, for air conditioning or food freezing apparatus are often left unattended for prolonged periods. If, because of some engine malfunction, the oil level in the engine crankcase should fall to a dangerously low level, or should the crankcase be completely emptied, extensive damage to the engine will occur if it is permitted to continue running.

The present invention provides a crankcase oil level responsive control which takes the form of a float operated switching device. The switching contacts of the device may be connected to a suitable alarm system or may be connected into the electrical system of the engine on which the control is installed, for example, in the engine magneto circuit.

It is an object of the present invention to provide a crankcase oil level responsive switching device which reacts positively to a dangerously low level of oil but which is unaffected by normal engine vibration.

It is a further object of the present invention to provide a switching device of the type described which can be economically manufactured and conveniently assembled but is rugged and dependable in operation.

It is a further object of the present invention to provide a switching device of the type described in which the switch housing is effectively sealed against the entry of crankcase fluids therein, but which permits the free transmission of motion of an exterior float into the interior of the switch housing.

The full nature of the invention will be understood from the accompanying drawings and the following description and claims:

FIG. 1 is a side sectional view of an apparatus embodying the present invention.

FIG. 2 is an end view of the apparatus of FIG. 1.

FIG. 3 is an end view of a component of the apparatus.

FIG. 4 is a top plan view of a component of the apparatus.

FIG. 5 is an end view of the over center spring forming a part of the apparatus.

FIG. 6 is a fragmentary detailed view of the operating arm.

FIG. 7 is a front view of the housing end cap.

FIG. 8 is a front view of the flexible diaphragm.

FIG. 9 is a side view of the float and a portion of the float arm.

Referring to the drawings, the control includes a tubular housing 10, one end of which is closed by a plate 11 formed of a suitable electrical insulating material, such as phenolic resin. The end wall or plate is mounted by means of tabs 12 struck from the housing and crimped over the plate. Extending through and rigidly supported by the plate are terminal members 13 and 14, the inner ends of the terminal members being shaped to provide contact surfaces. Only the contact surface 13a formed on the member 13 is visible in FIG. 1, however, it will be understood that the terminal member 14 has an identical contact surface horizontally aligned with the surface 13a.

The opposite, open end of the housing is partially closed by a rectangular housing mounting bracket or plate 16 which is rigidly fastened to the housing by any suitable means, such as welding, indicated at 17. The plate has an enlarged central aperture 18 (FIG. 1) formed therein, and this aperture is closed by a relatively thin flexible diaphragm 19. The diaphragm is shown in detail in FIG. 8 and is provided with a central aperture 19a and corner apertures 19b which register with similar apertures in the plate 16. The diaphragm may be formed of suitable oil resistant flexible material, such as synthetic rubber or the like. Interposed between the diaphragm and the outer face of the plate 16 is an annular, relatively thin washer 21. The assembly thus formed is clamped in place by the end cap 22 shown in detail in FIG. 7. The end cap has a central aperture 22a formed therein and is provided with extending tabs 23 which, as may best be seen in FIG. 2, are crimped into embracing relation with the plate 16. The cap 22 is further provided with opposed elements 24, struck from the material of the cap and defining the extreme positions of the float arm to be subsequently described.

The float arm 26 extends between the elements 24 and is provided with a flared portion 27 contiguous with the central portion of the outer face of the diaphragm 19. The terminal portion 28 of the float arm extends through the central aperture 19a in the diaphragm and centrally through the washer or spacer 29. The portion 28 of the float arm further extends through a central aperture in the vertical portion of a switch operating arm 31. The extreme end of the float arm portion 28 is staked as indicated at 32 to thereby rigidly hold the arm, diaphragm and operating arm 31 in assembled relation. As may be seen in FIG. 9, the float arm 26 is upwardly offset and is provided with a threaded portion 33 which receives a float 34. The float arm is preferably formed of brass rod stock and the float itself may be formed of any suitable oil buoyant material, shellac dipped cork being preferred.

The housing may be supported in overlying relation to a suitable aperture in the engine crankcase with fastening means, such as screws, 36 serving to support the assembly upon the crankcase indicated fragmentarily at 37. The screws 36 extend through the registering corner apertures in the plate 16, the diaphragm and the end cap 22. A gasket 38 may be interposed between the end cap and the supporting surface 37. When so mounted the float arm extends into the crankcase and the float rides upon the oil therein which may be at a level such as indicated at 39 in FIG. 9. As will be evident from FIG. 1, as the oil level varies, the float arm will move between extreme positions defined by engagement with the upper and lower elements 24.

The over center snap switch mechanism will now be described and includes a bracket 41 shown in detail in FIG. 3. The bracket includes a horizontal portion having a downturned tab 41a and aligned notch tabs 41b, the tabs 41b being provided with notches 42. The end of the bracket opposite the tab 41a has a contour providing a vertically extending, semicircular portion 41c which is welded or otherwise rigidly secured to the inner face of the plate 16.

Seated within the notches 42 are the sidewardly extending tabs 43 of a generally U-shaped contact leaf 44 shown in FIG. 4. The base portion 44a of the leaf is aligned with and adapted to engage either the contacts carried by members 13 and 14 or the portion 41a of the bracket 41. The base portion 41a of the leaf is provided with an inwardly extending ear 44b which extends through an aperture 46 in a C-shaped spring blade 47 which is shown in detail in FIG. 5. The edges 44c formed on opposite sides of the tab 44b bear against the surface of the blade 47. It will be understood that the opposite end of the blade 47 is also provided with an aperture identical with aperture 46 and this aperture receives a tab 31a formed, as indicated in FIG. 6, to extend from the free end of the arm 31. The surfaces indicated at 31b in FIG. 6 thus engage the adjacent surface of the blade 47.

When assembled, the spring blade 47 is held in compression and it will be understood that as the free end of the arm 31 moves downwardly from its position of FIG. 1, the free end 44a of the leaf 44 will be moved upwardly against the tab 41a with a snap action. As the arm 31 is moved upwardly from this position, the blade 47 will be moved across center and the free end 44a of the leaf 44 will be snapped downwardly so as to bridge the contacts formed on members 13 and 14. It will be understood that, as shown in FIG. 1, the float arm is in a mid position with the blade 47 at dead center position. In actual operation the blade would be moved rapidly through this mid position and the free end of the leaf 44 would be placed firmly in either its upper or lower position, depending upon the position of the float arm.

In operation, with the apparatus installed as previously described, when the crankcase oil level is normal, the float and float arm will be positioned so that the arm 31 is disposed downwardly from its position of FIG. 1, and the leaf 44 will be held against tab 41a. Should the oil level fall to an unsafe point, the arm 31 will be tilted upwardly from its position of FIG. 1, causing the leaf 44 to be snapped into engagement with the contacts carried by members 13 and 14, thereby grounding these contacts through the housing. With the terminals 13 and 14 connected to a suitable alarm system or to, for example, the magneto circuit of the engine, an appropriate signal will thus be given indicating the existence of a dangerously low oil level.

It will be noted that the snap switch construction and its linkage to the float is such that the switch has a relatively wide operating differential, whereby normal engine vibration will not falsely actuate the switch structure into contacts-open position. In assembling the diaphragm and end cap, a suitable sealing material is preferably utilized, such sealing material being indicated at 51 in FIG. 1. When assembled the diaphragm effectively seals the switch housing from crankcase fluid and yet permits the relative free transmission of motion from the float arm to the switch operating arm. It will further be noted that instead of grounding the contacts carried by members 13 and 14, the leaf 44 might be electrically insulated from its housing and the assembly installed so that on an abnormally low oil level the contacts would be bridged thereby completing a circuit to an alarm.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A crankcase oil level responsive control comprising a tubular housing having a closed end and an open end, a flexible oil-resistant diaphragm disposed over the open end of said housing, an end cap for the open end of said housing clamping said diaphragm to the housing and adapted to support said housing over an aperture in an engine crankcase, said end cap having a central aperture therein, a float arm having an oil buoyant float at its free end, said float arm extending through said end cap aperture and rigidly attached to said diaphragm, opposed elements extending angularly from said end cap into proximity with said float arm for limiting the motion of the float arm in the plane of the elements, an over-center snap-acting switch structure mounted within said housing, said switch structure including fixed contacts supported on the closed end of said housing and a two-position bridging contact member movable in snap action between engaged and disengaged positions with respect to said fixed contacts, and an operating arm rigidly supported at one of its ends on the inner face of said diaphragm and having an operative connection through a C-shaped spring blade with the bridging contact member of said snap-acting switch structure at its other end, whereby as said float arm is moved in response to variations in position of said float, said operating arm moves said blade into various positional relationships with said contact member, predetermined ones of said relationships initiating snap-action of said member to bridge and unbridge said fixed contacts.

2. A crankcase oil level responsive control comprising a tubular housing having a closed end and an open end, a flexible oil-resistant diaphragm disposed over the open end of said housing, an end cap for the open end of said housing clamping said diaphragm to the housing and adapted to support said housing over an aperture in an engine crankcase, said end cap having a central aperture therein, a float arm having an oil buoyant float at its free end, said float arm extending through said end cap aperture and rigidly attached to said diaphragm, an over-center snap-acting switch structure mounted within said housing, said switch structure including fixed contacts supported on the closed end of said housing and a bridging contact member movable in snap-action between engaged and disengaged positions with respect to said fixed contacts, and an operating arm rigidly supported at one of its ends on the inner face of said diaphragm and having an operative connection through a spring blade with the bridging contact member of said snap-acting switch structure at its other end, whereby as said float arm is moved in response to variations in position of said float, predetermined positions thereof initiate snap action of said contact member to bridge and unbridge said fixed contacts.

3. A crankcase oil level responsive control comprising a tubular housing having a closed end and an open end, a flexible oil-resistant diaphragm disposed over the open end of said housing, an end cap for the open end of said housing clamping said diaphragm to the housing and adapted to support said housing over an aperture in an engine crankcase, said end cap having a central aperture therein, an arm extending through said end cap aperture and rigidly attached to said diaphragm, said arm being movable in response to oil level variation, an over-center snap-acting switch structure mounted within said housing, said switch structure including fixed contacts supported on the closed end of said housing and a contact member movable in snap-action between engaged and disengaged positions with respect to said fixed contacts, and an operating arm rigidly supported on the inner face of said diaphragm and having an operative connection through a spring blade with the contact member of said snap-acting switch structure, whereby as said arm is moved in response to oil level variations, predetermined positions thereof initiate snap-action of said contact member to engage and disengage said fixed contacts.

References Cited in the file of this patent

UNITED STATES PATENTS

| | | |
|---|---|---|
| 2,354,282 | Shaw | July 25, 1944 |
| 2,587,747 | McCullough | Mar. 4, 1952 |
| 2,646,067 | Smith | July 21, 1953 |
| 2,671,529 | Hungerford | Mar. 9, 1954 |
| 2,719,196 | Wright | Sept. 27, 1955 |
| 2,730,591 | Nielsen | Jan. 10, 1956 |
| 2,748,220 | Lung | May 29, 1956 |

FOREIGN PATENTS

| | | |
|---|---|---|
| 657,112 | France | Jan. 11, 1929 |